(12) United States Patent
Shin

(10) Patent No.: US 11,285,909 B2
(45) Date of Patent: Mar. 29, 2022

(54) PASSENGER AIRBAG APPARATUS AND DEPLOYING METHOD THEREOF

(71) Applicant: HYUNDAI MOBIS CO., LTD., Seoul (KR)

(72) Inventor: Seok Min Shin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/136,769

(22) Filed: Dec. 29, 2020

(65) Prior Publication Data

US 2021/0229621 A1    Jul. 29, 2021

(30) Foreign Application Priority Data

Jan. 28, 2020  (KR) .......................... 10-2020-0009751

(51) Int. Cl.
  *B60R 21/261*  (2011.01)
  *B60R 21/205*  (2011.01)
  *B60R 21/16*   (2006.01)

(52) U.S. Cl.
  CPC .......... *B60R 21/261* (2013.01); *B60R 21/205* (2013.01); *B60R 2021/161* (2013.01)

(58) Field of Classification Search
  None
  See application file for complete search history.

(56) References Cited

U.S. PATENT DOCUMENTS 9,539,979 B2 *  1/2017  Miyata ................. B60R 21/239

FOREIGN PATENT DOCUMENTS

| CN | 108891378 A | * | 11/2018 |
| JP | H11170955 A | * | 6/1999 |
| JP | 2008201211 A | * | 9/2008 |
| KR | 10-0558916 B1 | | 3/2006 |

* cited by examiner

*Primary Examiner* — Faye M Fleming
(74) *Attorney, Agent, or Firm* — NovoTechIP International PLLC

(57) ABSTRACT

A passenger airbag apparatus includes a housing installed inside an instrument panel; an airbag cushion installed in the housing, deployed out of the instrument panel by gas produced in an inflator, and having a windshield-facing part and a passenger-facing part which face a windshield and a passenger, respectively, upon deployment; and a diffuser pocket disposed inside the airbag cushion while having a pocket structure capable of adjusting a flow of gas injected from the inflator, and connected to the windshield-facing part and restraining movement of the windshield-facing part toward the windshield.

12 Claims, 9 Drawing Sheets

PASSENGER AIRBAG APPARATUS AND DEPLOYING METHOD THEREOF

CROSS-REFERENCE TO RELATED APPLICATION

This application claims priority from and the benefit of Korean Patent Application No. 10-2020-0009751, filed on Jan. 28, 2020, which is hereby incorporated by reference for all purposes as if set forth herein.

BACKGROUND

Field

Exemplary embodiments of the present disclosure relate to a passenger airbag apparatus and a deploying method thereof, and more particularly, to a passenger airbag apparatus and a deploying method thereof for protecting a passenger seated on a passenger seat.

Discussion of the Background

In general, airbag systems for vehicles are apparatuses which instantaneously inflate an airbag in the event of a collision to reduce injury due to impact, separately from seat belts. Among these airbag systems, a driver airbag system is an apparatus which instantaneously inflates an airbag between a driver and a steering wheel in the event of a vehicle collision to reduce injury due to impact.

A passenger airbag for a vehicle as an airbag for protecting a passenger seated on a passenger seat is installed inside an upper surface part of an instrument panel. An airbag cushion of the passenger airbag protrudes upward by tearing a tear seam in the upper surface part of the instrument panel. Thereafter, the airbag cushion is changed in its deployment direction by hitting a windshield, and is deployed toward the passenger. With the airbag cushion deployed in this way, the passenger airbag for a vehicle prevents injury to the passenger by restraining the forward movement of the passenger in a state in which a front part of the airbag cushion is supported by the windshield.

In recent years, in order to secure an inner space of the vehicle, the degree of protrusion of the instrument panel toward the inside of the vehicle is decreasing. As the degree of protrusion of the instrument panel toward the inside of the vehicle decreases, an interval between the passenger airbag installed inside the instrument panel and the windshield becomes narrower. Accordingly, when the passenger airbag is deployed upward, the airbag cushion may strike the windshield more strongly, and due to this fact, the breakage of the windshield may be caused. Therefore, there is a need to solve such a problem.

The background art of the present disclosure is disclosed in Korean Patent Registration No. 0558916 (registered on Mar. 2, 2006 and entitled 'Invisible Passenger Airbag Apparatus for Vehicle').

SUMMARY

Various embodiments are directed to a passenger airbag apparatus and a deploying method thereof capable of preventing the breakage of a windshield by a deployment force of an airbag cushion.

In an embodiment, a passenger airbag apparatus may include: a housing installed inside an instrument panel; an airbag cushion installed in the housing, deployed out of the instrument panel by gas produced in an inflator, and having a windshield-facing part and a passenger-facing part which face a windshield and a passenger, respectively, upon deployment; and a diffuser pocket disposed inside the airbag cushion while having a pocket structure capable of adjusting a flow of gas injected from the inflator, and connected to the windshield-facing part and restraining movement of the windshield-facing part toward the windshield such that the airbag cushion does not strike the windshield.

The diffuser pocket may include: a cushion-restraining diffuser unit having one end which is fixed inside the housing and the other end which is deployed out of the housing, and disposed to face the windshield-facing part; a cushion coupling unit connecting the other end of the cushion-restraining diffuser unit and the windshield-facing part; and a holding diffuser unit having a length shorter than the cushion-restraining diffuser unit, and having one end which is fixed inside the housing and the other end which is connected to the other end of the cushion-restraining diffuser unit.

The cushion-restraining diffuser unit may include: a first fixed part disposed at one side of a gas inlet of the housing which is connected to the inflator; a first diffuser body part extending out of the housing from the first fixed part, and disposed to face the windshield-facing part; a first hole-forming part formed at an end of the first diffuser body part, and forming, in cooperation with the holding diffuser unit, a gas flow path through which gas may pass; and a first diffuser connection part formed at side ends of the first diffuser body part, and connected to the holding diffuser unit at both sides of the first hole-forming part.

The first diffuser body part may have a length longer than a shortest distance from the first fixed part to an expected strike area of the windshield and shorter than a longest distance from the first fixed part to the expected strike area; the expected strike area may be positioned to correspond to a directly upper part of a cushion opening part which is opened in the instrument panel when the airbag cushion is deployed, and may have a frontmost striking part which is closest to an engine room and a rearmost striking part which is closest to the passenger; the shortest distance from the first fixed part to the expected strike area may be a distance from the first fixed part to the frontmost striking part; and the longest distance from the first fixed part to the expected strike area may be a distance corresponding to a sum of the distance from the first fixed part to the frontmost striking part and a distance from the frontmost striking part to the rearmost striking part.

The cushion coupling unit may include: a first coupling part disposed between the first hole-forming part and the first fixed part, formed by coupling the first diffuser body part and the windshield-facing part, and maintained to be spaced apart from the windshield, by being restrained in movement thereof toward the windshield by the holding diffuser unit when the airbag cushion is deployed.

The cushion coupling unit may further include: a second coupling part formed at both sides of the first coupling part to extend in a direction parallel to the first diffuser connection part, formed by coupling the first diffuser body part and the windshield-facing part, and maintained to be spaced apart from the windshield, by being restrained in movement thereof toward the windshield by the holding diffuser unit when the airbag cushion is deployed.

The cushion coupling unit may further include: a third coupling part disposed at a position spaced apart from the first coupling part toward the first fixed part, formed by coupling the first diffuser body part and the windshield-facing part, and maintained to be spaced apart from the windshield, by being restrained in movement thereof toward the windshield by the holding diffuser unit when the airbag cushion is deployed.

The first coupling part, the second coupling part and the third coupling part may continuously extend in the form of a trapezoid or a triangle.

The holding diffuser unit may include: a second fixed part disposed at the other side of the gas inlet of the housing which is connected to the inflator; a second diffuser body part extending out of the housing from the second fixed part, and disposed to face the passenger-facing part; a second hole-forming part formed at an end of the second diffuser body part, and forming, in cooperation with the cushion-restraining diffuser unit, the gas flow path through which gas may pass; and a second diffuser connection part formed at side ends of the second diffuser body part, and connected to the cushion-restraining diffuser unit at both sides of the second hole-forming part.

The second diffuser body part may have a length shorter than a shortest distance from the second fixed part to an expected strike area of the windshield and longer than a distance from the second fixed part to a cushion opening part which is opened in the instrument panel when the airbag cushion is deployed; the expected strike area may be positioned to correspond to the directly upper part of the cushion opening part which is opened in the instrument panel when the airbag cushion is deployed, and may have a frontmost striking part which is closest to an engine room and a rearmost striking part which is closest to the passenger; and the shortest distance from the second fixed part to the expected strike area may be a distance from the second fixed part to the frontmost striking part.

The diffuser pocket may further include: a connection diffuser unit integrally connecting the cushion-restraining diffuser unit and the holding diffuser unit.

The connection diffuser unit may include: a connection body part having one end which is connected to the cushion-restraining diffuser unit and the other end which is connected to the holding diffuser unit; and an inlet hole part formed to pass through the connection body part, formed at a position corresponding to the gas inlet of the housing which is connected to the inflator, and forming a passage through which gas produced in the inflator is introduced between the cushion-restraining diffuser unit and the holding diffuser unit.

In an embodiment, a method for deploying a passenger airbag apparatus may include: deployment gas introducing step of introducing gas produced by an inflator into a diffuser pocket which has a pocket structure capable of adjusting a flow of gas and is disposed inside an airbag cushion; and strike-preventing deploying step of deploying the airbag cushion by restraining movement of the airbag cushion toward a windshield by the diffuser pocket so that the airbag cushion does not strike the windshield, while the gas introduced into the diffuser pocket is injected into the airbag cushion by being adjusted in a flow thereof.

The diffuser pocket may include: a cushion-restraining diffuser unit having one end which is fixed inside a housing and the other end which is deployed out of the housing, and disposed to face a windshield-facing part of the airbag cushion which faces the windshield; a cushion coupling unit connecting the other end of the cushion-restraining diffuser unit and the windshield-facing part; and a holding diffuser unit having a length shorter than the cushion-restraining diffuser unit, and having one end which is fixed inside the housing and the other end which is connected to the other end of the cushion-restraining diffuser unit, wherein, in the strike-preventing deploying step, movement of the other end of the cushion-restraining diffuser unit toward the windshield is restrained by the holding diffuser unit, and movement of the windshield-facing part toward the windshield is restrained by the cushion coupling unit.

In the passenger airbag apparatus and the deploying method thereof according to the embodiments of the present disclosure, not only a flow pattern of gas supplied to an airbag cushion may be adjusted using a diffuser pocket, but also, as a windshield-facing part of the airbag cushion is connected to the diffuser pocket, it is possible to restrain the movement and deployment of the airbag cushion toward the windshield, so that the airbag cushion does not strike the windshield.

According to the embodiments of the present disclosure, the breakage of the windshield by a deployment force of the airbag cushion may be prevented. Thus, the airbag cushion may stably protect a passenger seated on a rearward passenger seat in a state in which a front part of the airbag cushion is stably supported by the windshield. Accordingly, it is possible to more stably realize the function of the passenger airbag apparatus to prevent or reduce injury to the passenger seated on the passenger seat.

Also, according to the embodiments of the present disclosure, since the deployment of the airbag cushion toward the windshield may be restrained using the diffuser pocket, additional processes of designing and fabricating a separate component such as a tether for restraining the deployment of the airbag cushion and of coupling the separate component to the airbag cushion are not caused, and thus, it is possible to easily apply the present disclosure according to the existing processes while minimizing an increase in cost.

DETAILED DESCRIPTION OF THE ILLUSTRATED

Embodiments

Hereinafter, a passenger airbag apparatus and a deploying method thereof will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosure set forth herein.

Figure 1:
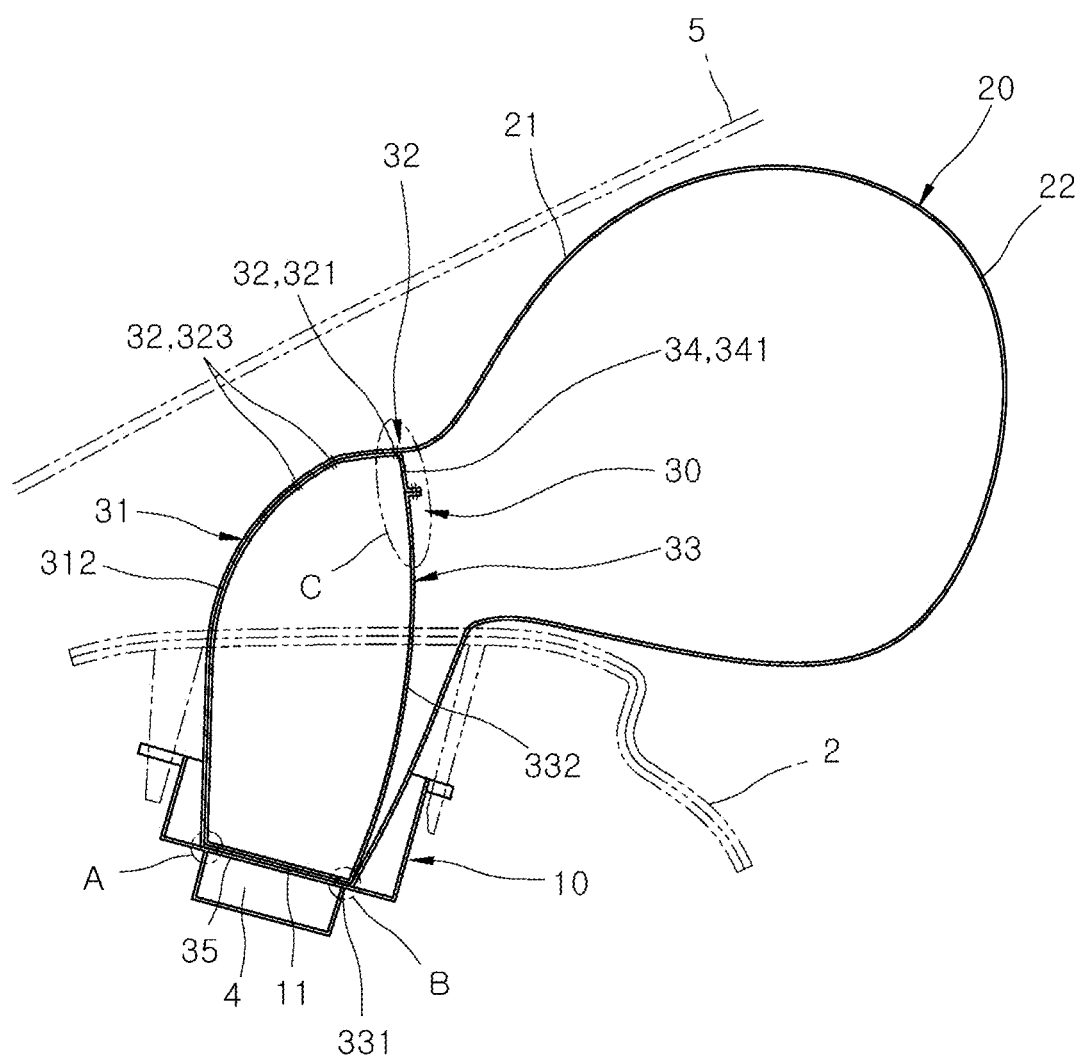
FIG. 1 is a side sectional view schematically illustrating a state in which a passenger airbag apparatus in accordance with an embodiment of the present disclosure is deployed.
Figure 2A:
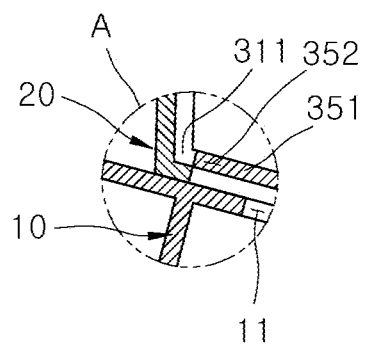
FIGS. 2A to 2C are of enlarged views for parts A, B and C of FIG. 1.
Figure 2B:
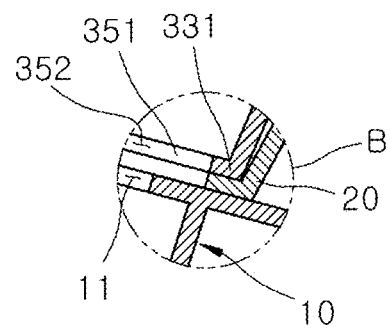
Figure 2C:
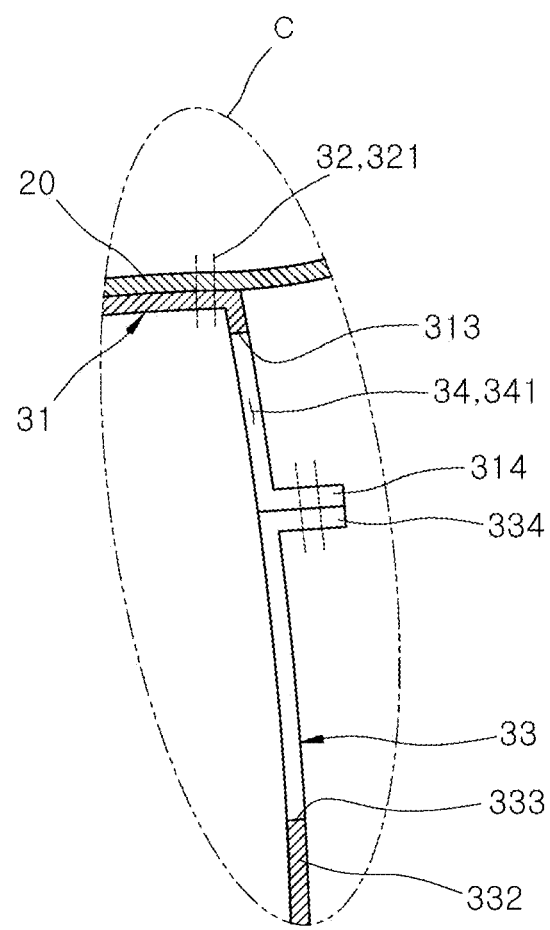
Figure 3:
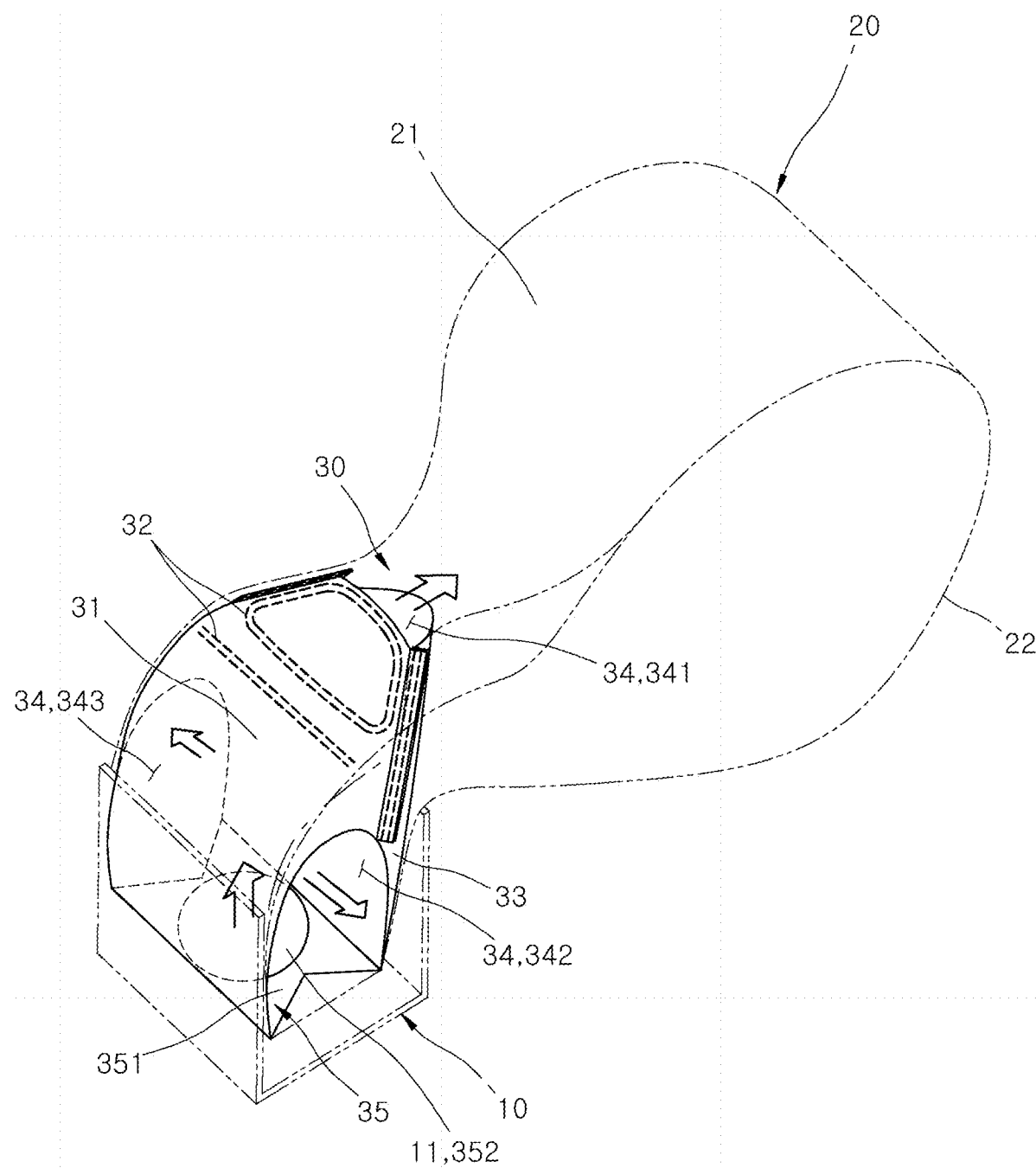
FIG. 3 is a perspective view schematically illustrating the passenger airbag apparatus in accordance with the embodiment of the present disclosure.

FIG. 1 is a side sectional view schematically illustrating a state in which a passenger airbag apparatus in accordance with an embodiment of the present disclosure is deployed, FIGS. 2A to 2C are of enlarged views for parts A, B and C of FIG. 1, and FIG. 3 is a perspective view schematically illustrating the passenger airbag apparatus in accordance with the embodiment of the present disclosure.

Referring to FIGS. 1 to 3, the passenger airbag apparatus 1 in accordance with the embodiment of the present disclosure includes a housing 10, an airbag cushion 20, and a diffuser pocket 30.

The housing 10, as a device unit in which the airbag cushion 20 is received in a folded state, has an accommodation space for accommodating the airbag cushion 20, and is installed inside an instrument panel 2. The housing 10 is positioned below the upper surface part of the instrument panel 2 which faces a windshield 5 in a vertical direction.

The airbag cushion 20 is installed in the housing 10, and is deployed out of the instrument panel 2 by passing through the upper surface part of the instrument panel 2 by a filling pressure of gas produced in an inflator 4. A passenger seat is positioned behind the instrument panel 2. The airbag cushion 20 has a deployment pattern in which it is deployed upwardly of the instrument panel 2 and is continuously deployed rearward toward a passenger seated on the passenger seat.

With the airbag cushion 20 deployed as described above, the airbag cushion 20 performs the function of a cushion which buffers an impact force applied to the passenger seated on the passenger seat in a state in which a front part of the airbag cushion 20 is supported by the windshield 5 in the front. The airbag cushion 20 has a windshield-facing part 21 and a passenger-facing part 22 which face the windshield 5 and the passenger, respectively, when the airbag cushion 20 is deployed in the pattern described above.

The diffuser pocket 30 has a pocket structure capable of adjusting a flow pattern of the gas injected from the inflator 4, and is disposed inside the airbag cushion 20. The gas injected from the inflator 4 passes through the diffuser pocket 30, and is then introduced into the airbag cushion 20. The gas introduced into the diffuser pocket 30 may flow into the airbag cushion 20 by being variously adjusted in terms of injection position, flow rate, flow speed and so forth depending on the structure and shape of the diffuser pocket 30.

The diffuser pocket 30 is made of a material having flexibility, such as a fiber material, so that the diffuser pocket 30 may be received in the housing 10 in a folded state but may be unfolded by a flow pressure of the gas introduced into the diffuser pocket 30. The diffuser pocket 30 may be made of the same material as the airbag cushion 20.

The diffuser pocket 30 in accordance with the embodiment of the present disclosure performs not only the function of adjusting the flow pattern of the gas injected from the inflator 4 but also the function of restraining the upward deployment of the airbag cushion 20 so that the airbag cushion 20 does not strike the windshield 5. The diffuser pocket 30 has a lower part which is fixed inside the housing 10 and an upper part which is connected to the windshield-facing part 21 of the airbag cushion 20 facing the windshield 5.

The airbag cushion 20 and the diffuser pocket 30 are integrally connected to each other by a coupling method such as stitching. According to this fact, if the length of the diffuser pocket 30 in the direction of the windshield 5 upon deployment, for example, the length of the diffuser pocket 30 in the vertical direction with the windshield 5 positioned above the instrument panel 2, is shorter than the distance from the lower end of the diffuser pocket 30 to the windshield 5, the upper part of the diffuser pocket 30 is spaced apart from the windshield 5 without contacting the windshield 5, and the windshield-facing part 21 of the airbag cushion 20 which is connected to the diffuser pocket 30 is also spaced apart from the windshield 5.

The expressions of contacting and being spaced apart are to be compared with a case where the airbag cushion 20 strikes the windshield 5 during the deployment process of the airbag cushion 20 and the diffuser pocket 30. If the airbag cushion 20 does not strike the windshield 5, it may contact the windshield 5 within a predetermined load. For example, with the airbag cushion 20 deployed, the airbag cushion 20 restrains the forward flailing of the passenger, seated on the passenger seat, in a state in which the front part of the airbag cushion 20 is supported by the windshield 5.

In the description of the present disclosure, the term 'strike' means that an impact force equal to or larger than a predetermined value is applied. The fact that the airbag cushion 20 strikes the windshield 5 means that the airbag cushion 20 applies an impact force equal to or larger than the predetermined value to the windshield 5 by the upward deployment force thereof in the continuous processes in which, when being deployed, the airbag cushion 20 is deployed toward the windshield 5 (upward) by passing through the upper surface part of the instrument panel 2 and then the deployment direction of the airbag cushion 20 is changed toward the passenger (rearward).

According to the embodiment of the present disclosure configured as mentioned above, not only a flow pattern of gas supplied to the airbag cushion 20 may be adjusted using the diffuser pocket 30, but also the movement and deployment of the airbag cushion 20 toward the windshield 5 may be restrained to prevent the airbag cushion 20 from striking the windshield 5.

Also, according to the embodiment of the present disclosure, by connecting the windshield-facing part 21 of the airbag cushion 20 to the diffuser pocket 30, not only the windshield 5 is prevented from being broken by being struck by the airbag cushion 20 when the airbag cushion 20 is deployed, but also the deployment of the airbag cushion 20 toward the passenger may be stably carried out.

Figure 4:
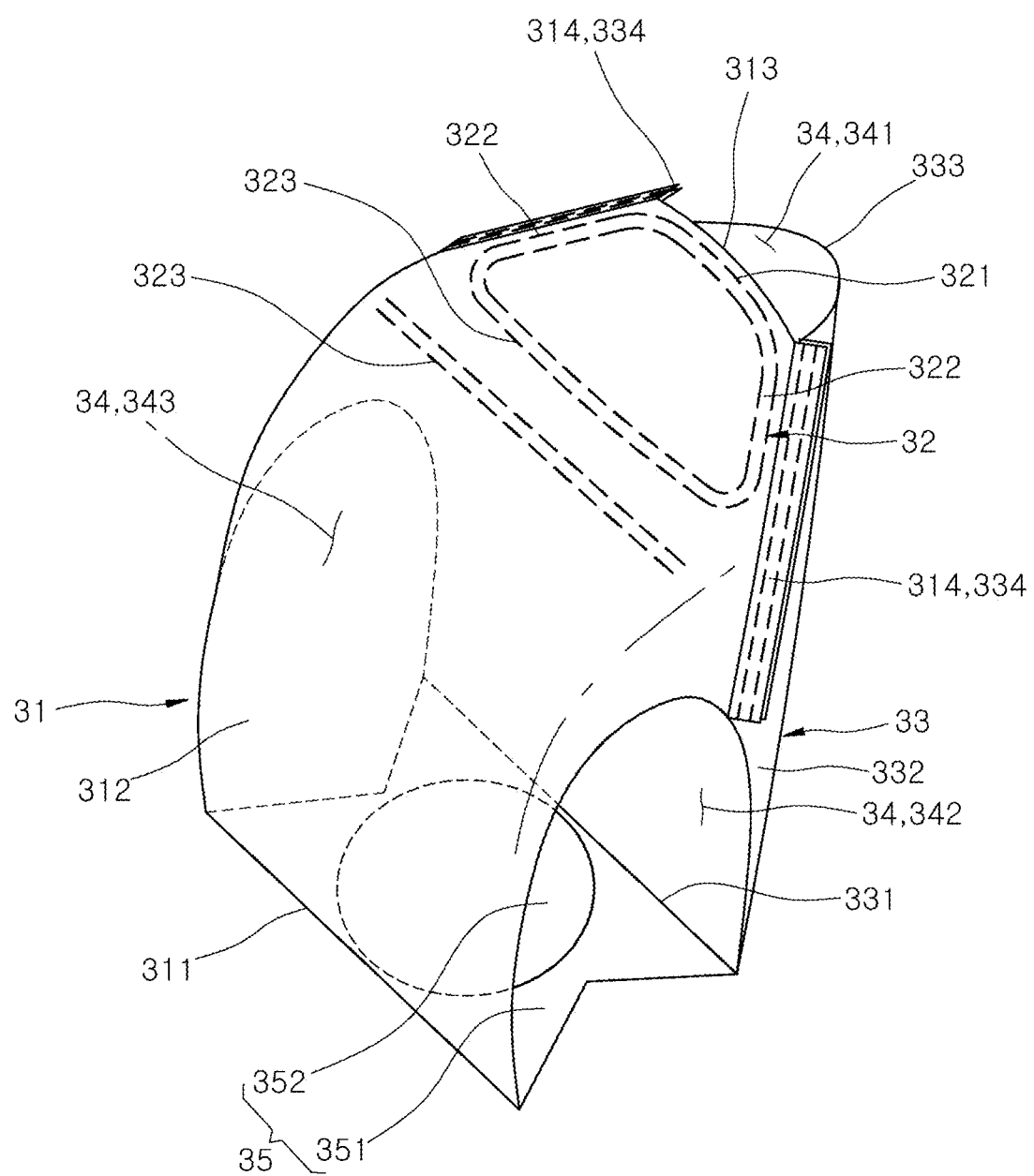
FIG. 4 is a perspective view schematically illustrating a diffuser pocket of the passenger airbag apparatus in accordance with the embodiment of the present disclosure.
Figure 5:
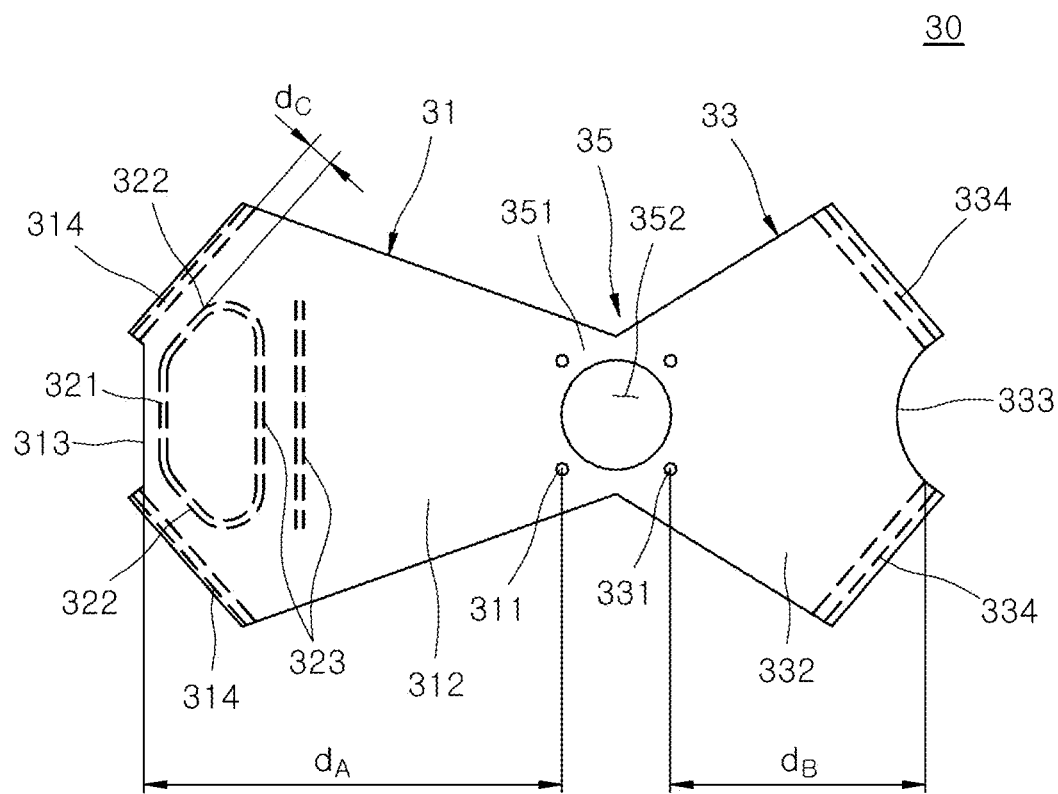
FIG. 5 is a plan view schematically illustrating a state in which the diffuser pocket of the passenger airbag apparatus in accordance with the embodiment of the present disclosure is developed.
Figure 6:
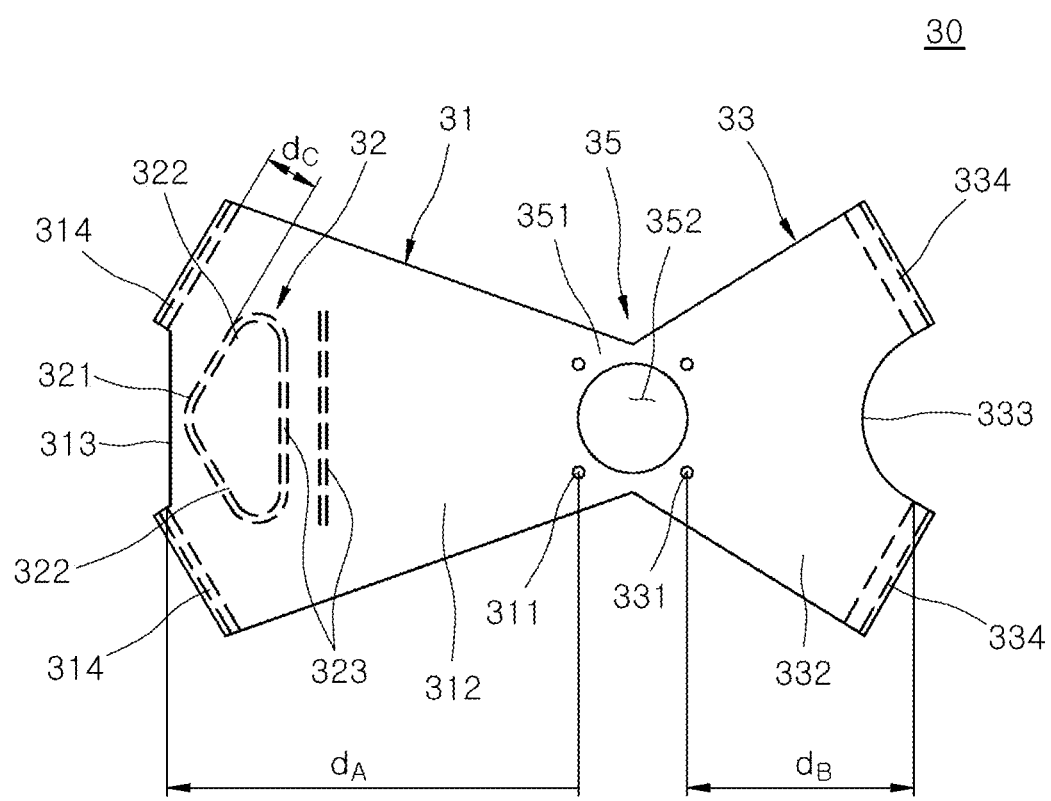
FIG. 6 is a plan view schematically illustrating a diffuser pocket of a passenger airbag apparatus in accordance with another embodiment of the present disclosure.

FIG. 4 is a perspective view schematically illustrating the diffuser pocket of the passenger airbag apparatus in accordance with the embodiment of the present disclosure, FIG. 5 is a plan view schematically illustrating a state in which the diffuser pocket of the passenger airbag apparatus in accordance with the embodiment of the present disclosure is developed, and FIG. 6 is a plan view schematically illustrating a diffuser pocket of a passenger airbag apparatus in accordance with another embodiment of the present disclosure.

Referring to FIGS. 4 to 6, the diffuser pocket 30 in accordance with the embodiment of the present disclosure includes a cushion-restraining diffuser unit 31, a cushion coupling unit 32, a holding diffuser unit 33, and a connection diffuser unit 35.

The cushion-restraining diffuser unit 31, as a unit of the diffuser pocket 30 which is disposed to face the windshield-facing part 21, has one end which is fixed inside the housing 10 and the other end which is deployed out of the housing 10, and is disposed to face the windshield-facing part 21. The cushion-restraining diffuser unit 31 in accordance with the embodiment of the present disclosure includes a first fixing part 311, a first diffuser body part 312, a first hole-forming part 313, and a first diffuser connection part 314.

Referring to FIGS. 1 to 3, the inflator 4 may be coupled to the lower part of the housing 10. A gas inlet 11 through which the gas produced in the inflator 4 may be introduced into the housing 10 is formed in the shape of a hole through a lower part of the housing 10. The lower part of the housing 10 may have a quadrangular shape, and the gas inlet 11 may have a circular sectional shape.

The first fixed part 311, as a device part in the cushion-restraining diffuser unit 31 which is kept fixed at a predetermined position, is fixed to the housing 10 at a position closer to an engine room (a front side) than the gas inlet 11. The first diffuser body part 312 extends from the first fixed part 311 to the outside of the housing 10, and is disposed to face the windshield-facing part 21.

The first diffuser body part 312 is received in the housing 10 in a folded state, extends to the outside of the housing 10 by the supply of gas, and is continuously deployed to a position over the instrument panel 2 by passing through the upper surface part of the instrument panel 2. At this time, the upper end of the first diffuser body part 312 does not contact the windshield 5.

The first hole-forming part 313 is a device part for creating rearward gas flow at a center portion of the airbag cushion 20. The first hole-forming part 313 is formed at a middle portion of the upper end of the first diffuser body part 312 in a left-and-right direction (a widthwise direction), and forms, in cooperation with the holding diffuser unit 33, a first gas flow path 341 through which gas may pass.

The first diffuser body part 312 in accordance with the embodiment of the present disclosure has a shape in which a width in the left-and-right direction gradually increases from the first fixed part 311 toward the first diffuser connection part 314. While the first gas flow path 341 may be formed at the center portion of the diffuser pocket 30 by the first hole-forming part 313, by the shape of the first diffuser body part 312 as described above, a second gas flow path 342 and a third gas flow path 343 may be formed more clearly on the left and right sides, respectively, of the diffuser pocket 30.

By the diffuser pocket 30 in accordance with the embodiment of the present disclosure, a gas flow path 34 for forming a flow path through which gas is injected from the diffuser pocket 30 into the airbag cushion 20 has a structure in which three gas flow paths including the first gas flow path 341, the second gas flow path 342 and the third gas flow path 343 are formed and disposed by being distributed in the left-and-right direction. According to this fact, the deployment of the airbag cushion 20 may be smoothly carried out while gas is introduced at left and right sides and a center portion.

The first diffuser connection part 314 is a device part which is connected to the upper portion of the holding diffuser unit 33. As the first diffuser connection part 314 is connected to the holding diffuser unit 33, a downwardly pulling restraining force by the holding diffuser unit 33 is applied to the first diffuser body part 312. The first diffuser connection part 314 is formed at both left and right ends of the upper end of the first diffuser body part 312.

The first diffuser connection part 314 is connected to the holding diffuser unit 33 at left and right sides with the first hole-forming part 313 interposed therebetween. The first diffuser connection part 314 is formed to extend leftward and rightward while having linear shapes along the edges of the first diffuser body part 312. The first diffuser connection part 314 may be integrally coupled with the holding diffuser unit 33 by a coupling method such as stitching in a state in which the first diffuser connection part 314 is brought into contact with the holding diffuser unit 33.

The first diffuser connection part 314 in accordance with the embodiment of the present disclosure has extension shapes which are inclined with respect to the first fixed part 311 at the left and right ends of the first diffuser body part 312. Due to this fact, if the first diffuser connection part 314 is applied with a downward force by the holding diffuser unit 33, as the first diffuser connection part 314 is positioned at the left and right sides of the diffuser pocket 30, the upper part of the diffuser pocket 30 forms a pocket structure which has a substantially circular three-dimensional shape when viewed in its entirety.

With the diffuser pocket 30 deployed, the first diffuser connection part 314 is positioned at the left and right sides of the diffuser pocket 30. When viewed from the side, the first diffuser connection part 314 has a shape which extends from a rear upper portion to a front lower portion, and when viewed from the top, the first diffuser connection part 314 has a shape which extends in the left-and-right direction. Accordingly, the transfer and application of a downward restraining force through the first diffuser connection part 314 may be stably carried out over the entirety of the upper part and the left and right sides of the diffuser pocket 30.

The cushion coupling unit 32 connects the upper part of the cushion-restraining diffuser unit 31, which faces the windshield 5 with the windshield-facing part 21 of the airbag cushion 20 interposed therebetween, and the windshield-facing part 21. The cushion coupling unit 32 may be formed by integrally coupling the windshield-facing part 21 and the upper part of the first diffuser body part 312 by a coupling method such as stitching in a state in which the windshield-facing part 21 and the upper part of the first diffuser body part 312 are brought into contact with each other.

When the airbag cushion 20 is deployed, the cushion coupling unit 32 is pulled downward by the holding diffuser unit 33 to be restrained in its movement toward the windshield 5, and thus, is maintained in a state in which the cushion coupling unit 32 is spaced apart from the windshield 5. The fact that the cushion coupling unit 32 is spaced apart from the windshield 5 means that the windshield-facing part 21 and a portion of the first diffuser body part 312 where the cushion coupling unit 32 is positioned are spaced apart from the windshield 5. The cushion coupling unit 32 in accordance with the embodiment of the present disclosure includes a first coupling part 321, a second coupling part 322, and a third coupling part 323.

The first coupling part 321 is positioned closest to the passenger in the cushion coupling unit 32, and serves as a device part to which a downward force for restraining the upward deployment of the airbag cushion 20 is mainly applied. The first coupling part 321 is disposed between the first hole-forming part 313 and the first fixed part 311. The first coupling part 321 may be disposed to be spaced apart from the first hole-forming part 313 by a predetermined interval. The position of the uppermost end of the diffuser pocket 30 which is substantially closest to the windshield 5 is determined depending on the position of the first coupling part 321.

The second coupling part 322 is formed at both left and right sides of the first coupling part 321 to extend in a direction parallel to the first diffuser connection part 314 so that a restraining force does not concentratedly act on the first coupling part 321 but may distributedly act over an extended area. The second coupling part 322 may be disposed to be spaced apart from the first diffuser connection part 314 by a predetermined interval.

The cushion-restraining diffuser unit 31 receives a downward restraining force through the first diffuser connection part 314. In this regard, by forming the second coupling part 322, a load applied to the first diffuser connection part 314 may evenly act over a pair of second coupling parts 322 at left and right sides.

The third coupling part 323 is a device part which increases a coupling force between the airbag cushion 20 and the upper part of the cushion-restraining diffuser unit 31 and prevents the airbag cushion 20 and the cushion-restraining diffuser unit 31 from coming off from each other so that the restraint of the upward deployment of the airbag cushion 20 by the first coupling part 321 and the second coupling part 322 as described above may be more stably carried out.

The third coupling part 323 is disposed at a position spaced apart from the first coupling part 321 toward the first fixed part 311, and is formed to extend in a widthwise direction of the diffuser pocket 30 and the airbag cushion 20, that is, in the left-and-right direction. One or more third coupling parts 323 may be provided. The number or length of the third coupling parts 323 may be applied by being variously changed depending on the lengths and shapes of the diffuser pocket 30 and the airbag cushion 20.

The third coupling part 323 in accordance with the embodiment of the present disclosure has a structure in which two third coupling parts 323 are disposed at a spacing interval in a lengthwise direction of the diffuser pocket 30. In addition, among a plurality of third coupling parts 323, one which is positioned closest to the first coupling part 321 and the second coupling part 322 has a structure which is continuously connected to the first coupling part 321 and the second coupling part 322.

The cushion coupling unit 32 in accordance with the embodiment of the present disclosure has a shape in which the first coupling part 321, the second coupling part 322 and the third coupling part 323 continuously extend in the form of a trapezoid as illustrated in FIG. 5, or has a shape in which the first coupling part 321, the second coupling part 322 and the third coupling part 323 continuously extend in the form of a triangle as illustrated in FIG. 6.

Accordingly, even without a separate process of overlapping stitching lines, it is possible to stably secure the coupling force of the ends of each of the first coupling part 321, the second coupling part 322 and the third coupling part 323. Also, by rounding the connections between the first coupling part 321, the second coupling part 322 and the third coupling part 323, it is possible to prevent the airbag cushion 20 or the diffuser pocket 30 from being torn or coming off from each other by a downward force that is instantaneously applied to the cushion coupling unit 32.

The holding diffuser unit 33 is a unit which applies a downward force to the upper part of the cushion-restraining diffuser unit 31 of the diffuser pocket 30 and thereby restrains the upward deployment of the cushion-restraining diffuser unit 31 toward the windshield 5. The holding diffuser unit 33 has a length shorter than the cushion-restraining diffuser unit 31, and is positioned below the upper end of the cushion-restraining diffuser unit 31 when the airbag cushion 20 is deployed.

The holding diffuser unit 33 has one end which is fixed inside the housing 10, and the other end which is connected to the upper part of the cushion-restraining diffuser unit 31, more particularly, the first diffuser connection part 314. The holding diffuser unit 33 in accordance with the embodiment of the present disclosure includes a second fixed part 331, a second diffuser body part 332, a second hole-forming part 333, and a second diffuser connection part 334.

The second fixed part 331, as a device part in the holding diffuser unit 33 which is kept fixed at a predetermined position, is fixed to the housing 10 at a position closer to the passenger than the gas inlet 11. The first fixed part 311 and the second fixed part 331 are disposed at the front and the rear, respectively, to be spaced apart from each other with the gas inlet 11 interposed therebetween. Accordingly, the gas injected into the housing 10 through the gas inlet 11 is naturally introduced between the cushion-restraining diffuser unit 31 and the holding diffuser unit 33.

The second diffuser body part 332 extends from the second fixed part 331 to the outside of the housing 10, and is disposed to face the passenger-facing part 22. The second diffuser body part 332 has a shorter length than the first diffuser body part 312. The second diffuser body part 332 in accordance with the embodiment of the present disclosure has a shape in which a width in the left-and-right direction gradually increases from the second fixed part 331 toward the second diffuser connection part 334.

While the first gas flow path 341 may be formed at the center portion of the diffuser pocket 30 by the first hole-forming part 313 and the second hole-forming part 333, by the shape of the second diffuser body part 332 as described above, the second gas flow path 342 and the third gas flow path 343 may be formed more clearly on the left and right sides, respectively, of the diffuser pocket 30.

The first diffuser body part 312 and the second diffuser body part 332 in accordance with the embodiment of the present disclosure have shapes in which widths in the left-and-right direction gradually increase from the first fixed part 311 and the second fixed part 331 toward the first diffuser connection part 314 and the second diffuser connection part 334. However, this is nothing but an illustration of the embodiment of the present disclosure, and it is to be noted that the disclosure is not limited thereto. The first diffuser body part 312 and the second diffuser body part 332 may be applied by being changed to various shapes including an embodiment having a rectangular shape, depending on the shape of the airbag cushion 20.

The second hole-forming part 333, as a device part for forming the first gas flow path 341 in cooperation with the first hole-forming part 313 of the cushion-restraining diffuser unit 31, is formed at a middle portion of the upper end of the second diffuser body part 332 in the left-and-right direction. The second diffuser connection part 334, as a device part which is connected to the upper part of the cushion-restraining diffuser unit 31, applies a downwardly pulling restraint force to the first diffuser connection part 314.

The second diffuser connection part 334 is formed at both ends, in the left-and-right direction, of the upper end of the second diffuser body part 332. The second diffuser connection part 334 is formed on the end of the second diffuser body part 332, and is connected to the first diffuser connection part 314 of the cushion-restraining diffuser unit 31 on both sides of the second hole-forming part 333. The first diffuser connection part 314 and the second diffuser connection part 334 may be integrally coupled to each other by a coupling method such as stitching in a state in which the first diffuser connection part 314 and the second diffuser connection part 334 are brought into contact with each other.

Similarly to the first diffuser connection part 314, the second diffuser connection part 334 is formed to extend leftward and rightward while having linear shapes along the edges of the second diffuser body part 332. Similarly to the first diffuser connection part 314, the second diffuser connection part 334 in accordance with the embodiment of the present disclosure has extension shapes which are inclined with respect to the second fixed part 331 at the left and right ends of the second diffuser body part 332.

Accordingly, when the diffuser pocket 30 is deployed, if the first diffuser connection part 314 is pulled by the second diffuser connection part 334 to receive a downward force, the front ends of the first diffuser connection part 314 and the second diffuser connection part 334 are positioned at the left part and the right part of the diffuser pocket 30 to extend in a front-and-rear direction, and the rear ends thereof are positioned at the rear part of the diffuser pocket 30 to extend in the left-and-right direction.

With the diffuser pocket 30 deployed, the rear ends of the first diffuser connection part 314 and the second diffuser connection part 334 are positioned at the rear part of the diffuser pocket 30, and the first gas flow path 341 is formed at the rear part of the diffuser pocket 30, that is, between the rear ends of the first diffuser connection part 314 and the second diffuser connection part 334, to be open toward the rear. By the first gas flow path 341 which is formed to be open toward the rear, the passenger-facing part 22 of the airbag cushion 20 may be smoothly deployed toward the passenger.

The connection diffuser unit 35 integrally connects the cushion-restraining diffuser unit 31 and the holding diffuser unit 33. The connection diffuser unit 35 is formed to extend continuously between the first fixed part 311 of the cushion-restraining diffuser unit 31 and the second fixed part 331 of the holding diffuser unit 33. The connection diffuser unit 35 in accordance with the embodiment of the present disclosure includes a connection body part 351 and an inlet hole part 352.

The connection body part 351 has a width capable of covering the inlet hole part 352. The connection body part 351 has a front end which is connected to the cushion-restraining diffuser unit 31 and a rear end which is connected to the holding diffuser unit 33. The inlet hole part 352 is formed to pass through the connection body part 351. The inlet hole part 352 is formed to pass through the connection body part 351 at a position corresponding to the gas inlet 11 of the housing 10. The gas produced in the inflator 4 is introduced between the cushion-restraining diffuser unit 31 and the holding diffuser unit 33 through the gas inlet 11 and the inlet hole part 352.

As the connection diffuser unit 35 has a structure which is continuously connected to the cushion-restraining diffuser unit 31 and the holding diffuser unit 33, the first fixed part 311 and the second fixed part 331 may be more stably fixed and coupled to the housing 10. The first fixed part 311 and the second fixed part 331 may be fixed to the lower part of the housing 10 by locking members such as bolts with the inlet hole part 352 interposed therebetween.

Figure 7:
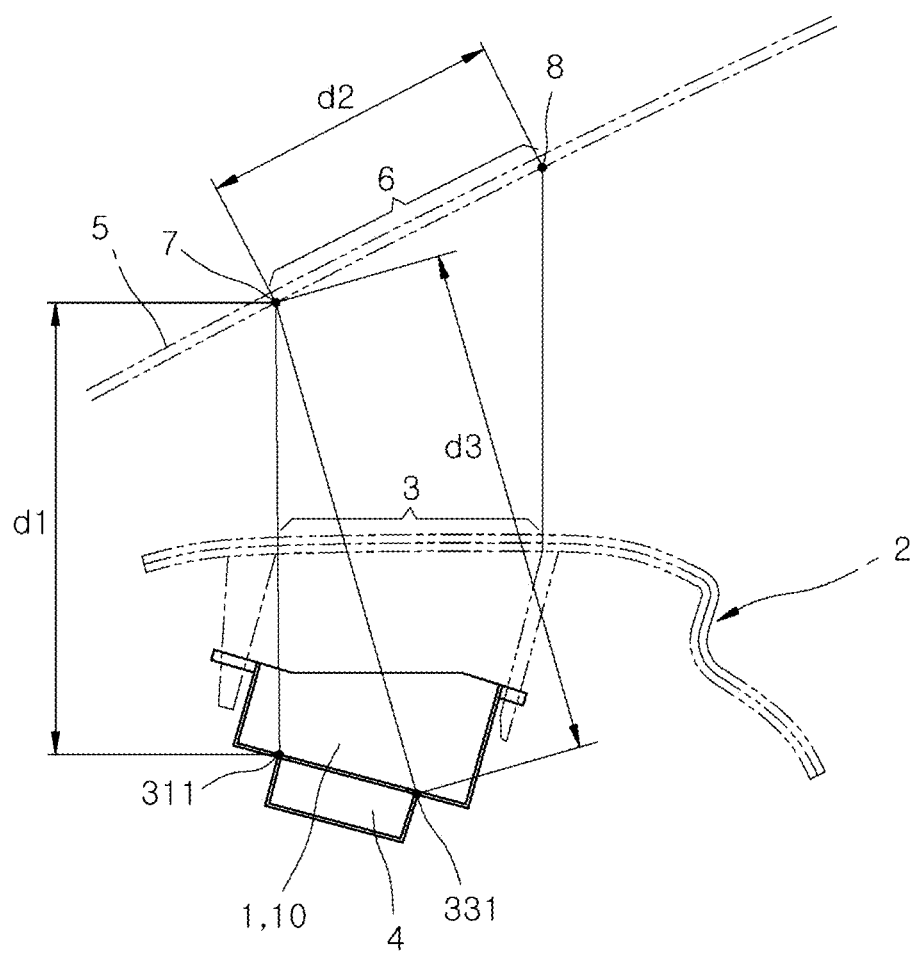
FIG. 7 is a side sectional view schematically illustrating a state before the passenger airbag apparatus in accordance with the embodiment of the present disclosure is deployed.
Figure 8:
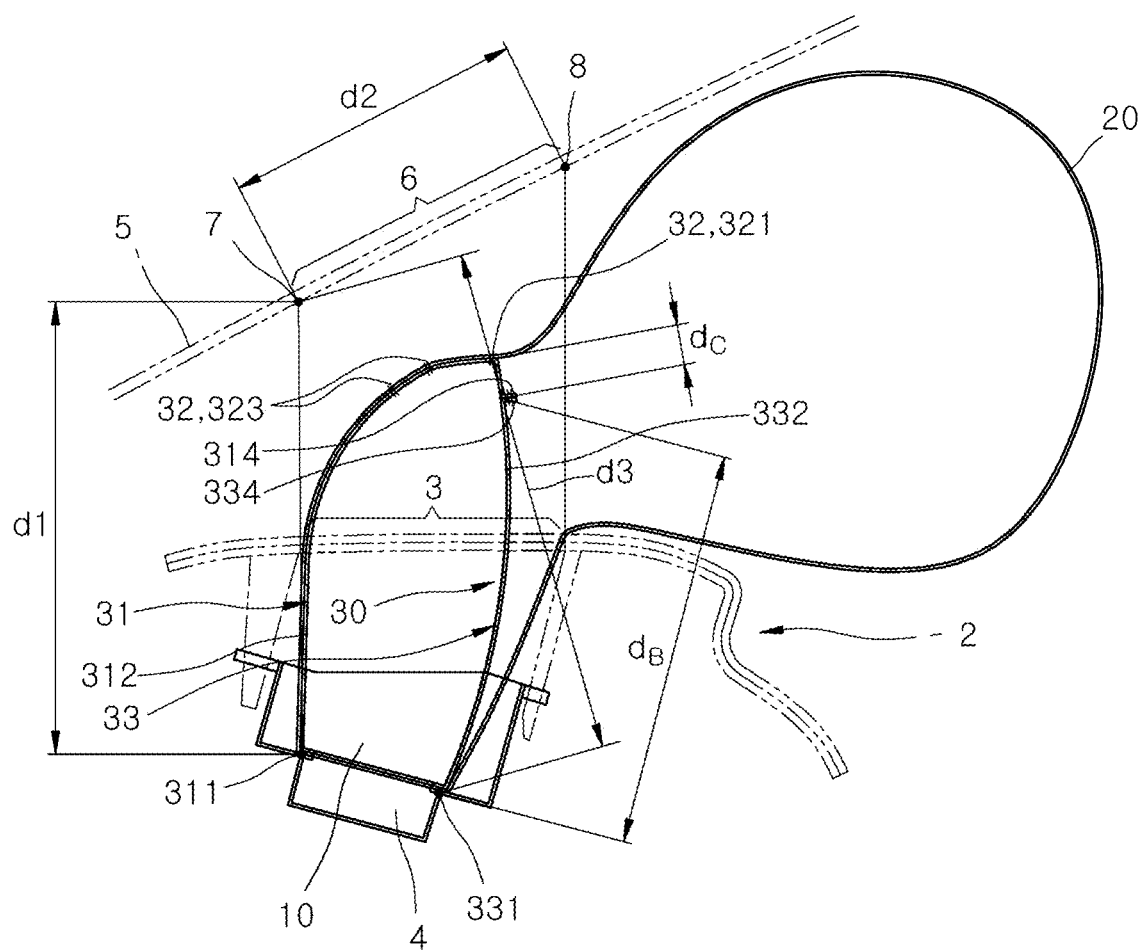
FIG. 8 is a conceptual view to assist in the explanation of lengths of the diffuser pocket of the passenger airbag apparatus in accordance with the embodiment of the present disclosure.

FIG. 7 is a side sectional view schematically illustrating a state before the passenger airbag apparatus in accordance with the embodiment of the present disclosure is deployed, and FIG. 8 is a conceptual view to assist in the explanation of lengths of the diffuser pocket of the passenger airbag apparatus in accordance with the embodiment of the present disclosure.

Referring to FIGS. 7 and 8, an expected strike area 6, as an area where a striking collision of the airbag cushion 20 to the windshield 5 is expected when the diffuser pocket 30 in accordance with the embodiment of the present disclosure is not applied, is positioned to correspond to an directly upper part of a cushion opening part 3 which is opened in the instrument panel 2 when the airbag cushion 20 is deployed. The expected strike area 6 has a frontmost striking part 7 which is closest to the engine room and a rearmost striking part 8 which is closest to the passenger.

The cushion-restraining diffuser unit 31, more specifically, the first diffuser body part 312, has a length longer than a shortest distance from the first fixed part 311 to the expected strike area 6 of the windshield 5. The shortest distance from the first fixed part 311 to the expected strike area 6 is a distance d1 from the first fixed part 311 to the frontmost striking part 7.

Further, the first diffuser body part 312 may have a length shorter than a longest distance from the first fixed part 311 to the expected strike area 6. The longest distance from the first fixed part 311 to the expected strike area 6 is a distance d1+d2 corresponding to the sum of the distance d1 from the first fixed part 311 to the frontmost striking part 7 and a distance d2 from the frontmost striking part 7 to the rearmost striking part 8.

That is to say, a length $d_A$ of the first diffuser body part 312 has a length within a range that is equal to or larger than the distance d1 from the first fixed part 311 to the frontmost striking part 7 and is equal to or smaller than the distance d1+d2 corresponding to the sum of the distance d1 from the first fixed part 311 to the frontmost striking part 7 and the distance d2 from the frontmost striking part 7 to the rearmost striking part 8.

The holding diffuser unit 33, more specifically, the second diffuser body part 332, has a length shorter than a shortest distance from the second fixed part 331 to the expected strike area 6 of the windshield 5. The shortest distance from the second fixed part 331 to the expected strike area 6 is a distance d3 from the second fixed part 331 to the frontmost striking part 7. Further, the second diffuser body part 332 has a length longer than a distance from the second fixed part 331 to the cushion opening part 3 which is opened in the instrument panel 2 when the airbag cushion 20 is deployed.

That is to say, a length $d_B$ of the second diffuser body part 332 has a length within a range that is equal to or smaller than is less than the distance d3 from the second fixed part 331 to the frontmost striking part 7 and is equal to or larger than the distance from the second fixed part 331 to the cushion opening part 3.

Referring to FIG. 8, in a state in which the passenger airbag apparatus 1 in accordance with the embodiment of the present disclosure is deployed, the diffuser pocket 30 has, in the direction of the windshield 5, a total extension length corresponding to the sum of the length $d_B$ of the second diffuser body part 332 and a separation distance $d_C$ between the first diffuser connection part 314 and the cushion coupling unit 32.

The extension length $d_B+d_C$, in the direction of the windshield 5, of the diffuser pocket 20 deployed as described above is shorter than the distance from the lower end of the second diffuser body part 332, that is, the second fixed part 331, to the windshield 5, thereby finally applying a downward restraining force to the windshield-facing part 21 of the airbag cushion 20. The separation distance $d_C$ between the first diffuser connection part 314 and the cushion coupling unit 32 is a distance between the first diffuser connection part 314 and the second coupling part 322 or a distance between the first diffuser connection part 314 and both ends of the first coupling part 321.

By limiting the lengths of the cushion-restraining diffuser unit 31 and the holding diffuser unit 33 as described above, at least a part of the cushion coupling unit 32, in particular, the first coupling part 321, is positioned to be spaced apart from the windshield 5 within the expected strike area 6. Accordingly, it is possible to prevent the windshield-facing part 21 of the airbag cushion 20 from striking the windshield 5.

According to the passenger airbag apparatus 1 in accordance with the embodiment of the present disclosure, configured as mentioned above, the deployment of the passenger airbag apparatus may be carried out sequentially through deployment gas introducing step of introducing gas produced by the inflator 4 into the diffuser pocket 30, and strike-preventing deploying step of deploying the airbag cushion 20 by restraining the movement of the airbag cushion 20 toward the windshield 5 while the gas introduced into the diffuser pocket 30 is injected into the airbag cushion 20 by being adjusted in a flow pattern thereof.

When, in the strike-preventing deploying step, the movement of the airbag cushion 20 toward the windshield 5 is restrained so that the airbag cushion 20 does not strike the windshield 5, the movement of the other end of the cushion-restraining diffuser unit 31 toward the windshield 5 is restrained by the holding diffuser unit 33 of the diffuser pocket 30, and at the same time, the movement of the windshield-facing part 21 toward the windshield 5 is restrained by the cushion coupling unit 32.

By the passenger airbag apparatus 1 and the deploying method thereof in accordance with the embodiments of the present disclosure configured as mentioned above, not only a flow pattern of gas supplied to the airbag cushion 20 may be adjusted using the diffuser pocket 30, but also, by connecting the windshield-facing part 21 of the airbag cushion 20 to the diffuser pocket 30, the movement and deployment of the airbag cushion 20 toward the windshield 5 may be restrained to prevent the airbag cushion 20 from striking the windshield 5.

According to the embodiments of the present disclosure, the breakage of the windshield 5 by a deployment force of the airbag cushion 20 may be prevented. Thus, the airbag cushion 20 may stably protect the passenger seated on the rearward passenger seat in a state in which the front part of the airbag cushion 20 is stably supported by the windshield 5. Accordingly, it is possible to more stably realize the function of the passenger airbag apparatus to prevent or reduce injury to the passenger seated on the passenger seat.

Also, according to the embodiments of the present disclosure, since the deployment of the airbag cushion 20 toward the windshield 5 may be restrained using the diffuser pocket 30, additional processes of designing and fabricating a separate component such as a tether for restraining the deployment of the airbag cushion 20 and of coupling the separate component to the airbag cushion 20 are not caused, and thus, it is possible to easily apply the present disclosure according to the existing processes while minimizing an increase in cost.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A passenger airbag apparatus comprising:
    a housing installed inside an instrument panel of a vehicle;
    an airbag cushion stored in the housing and configured to deploy out of the instrument panel when gas produced by an inflator is introduced thereto, the airbag cushion having a windshield-facing part configured to face a windshield of the vehicle and a passenger-facing part configured to face a passenger when the airbag cushion is deployed; and
    a diffuser pocket positioned within the airbag cushion and having a pocket structure configured to restrain a movement of the windshield-facing part of the airbag cushion such that the airbag cushion does not strike the windshield, wherein the diffuser pocket comprises:
        a cushion-restraining diffuser unit facing the windshield-facing part and having a first end affixed to the housing and a second end configured to deploy out of the housing when the gas is introduced to the diffuser pocket;
    a cushion coupling unit connecting the second end of the cushion-restraining diffuser unit and the windshield-facing part of the airbag cushion; and
    a holding diffuser unit shorter than the cushion-restraining diffuser unit and having a first end affixed to the housing and a second end connected to the second end of the cushion-restraining diffuser unit.

2. The passenger airbag apparatus according to claim 1, wherein the cushion-restraining diffuser unit comprises:
    a first fixed part disposed at one side of a gas inlet of the housing which is connected to the inflator;
    a first diffuser body part extending out of the housing from the first fixed part, and disposed to face the windshield-facing part;
    a first hole-forming part formed at an end of the first diffuser body part, and forming, in cooperation with the holding diffuser unit, a gas flow path through which gas may pass; and
    a first diffuser connection part formed at side ends of the first diffuser body part, and connected to the holding diffuser unit at both sides of the first hole-forming part.

3. The passenger airbag apparatus according to claim 2, wherein
    the first diffuser body part has a length longer than a shortest distance from the first fixed part to an expected strike area of the windshield and shorter than a longest distance from the first fixed part to the expected strike area,
    the expected strike area is positioned to correspond to a directly upper part of a cushion opening part which is opened in the instrument panel when the airbag cushion is deployed, and has a frontmost striking part which is closest to an engine room and a rearmost striking part which is closest to the passenger,
    the shortest distance from the first fixed part to the expected strike area is a distance from the first fixed part to the frontmost striking part, and
    the longest distance from the first fixed part to the expected strike area is a distance corresponding to a sum of the distance from the first fixed part to the frontmost striking part and a distance from the frontmost striking part to the rearmost striking part.

4. The passenger airbag apparatus according to claim 2, wherein the cushion coupling unit comprises:

a first coupling part disposed between the first hole-forming part and the first fixed part, formed by coupling the first diffuser body part and the windshield-facing part, and maintained to be spaced apart from the windshield, by being restrained in movement thereof toward the windshield by the holding diffuser unit when the airbag cushion is deployed.

5. The passenger airbag apparatus according to claim 4, wherein the cushion coupling unit further comprises:
a second coupling part formed at both sides of the first coupling part to extend in a direction parallel to the first diffuser connection part, formed by coupling the first diffuser body part and the windshield-facing part, and maintained to be spaced apart from the windshield, by being restrained in movement thereof toward the windshield by the holding diffuser unit when the airbag cushion is deployed.

6. The passenger airbag apparatus according to claim 5, wherein the cushion coupling unit further comprises:
a third coupling part disposed at a position spaced apart from the first coupling part toward the first fixed part, formed by coupling the first diffuser body part and the windshield-facing part, and maintained to be spaced apart from the windshield, by being restrained in movement thereof toward the windshield by the holding diffuser unit when the airbag cushion is deployed.

7. The passenger airbag apparatus according to claim 6, wherein the first coupling part, the second coupling part and the third coupling part continuously extend in the form of a trapezoid or a triangle.

8. The passenger airbag apparatus according to claim 1, wherein the holding diffuser unit comprises:
a second fixed part disposed at the other side of the gas inlet of the housing which is connected to the inflator;
a second diffuser body part extending out of the housing from the second fixed part, and disposed to face the passenger-facing part;
a second hole-forming part formed at an end of the second diffuser body part, and forming, in cooperation with the cushion-restraining diffuser unit, the gas flow path through which gas may pass; and
a second diffuser connection part formed at side ends of the second diffuser body part, and connected to the cushion-restraining diffuser unit at both sides of the second hole-forming part.

9. The passenger airbag apparatus according to claim 8, wherein
the second diffuser body part has a length shorter than a shortest distance from the second fixed part to an expected strike area of the windshield and longer than a distance from the second fixed part to a cushion opening part which is opened in the instrument panel when the airbag cushion is deployed,
the expected strike area is positioned to correspond to the directly upper part of the cushion opening part which is opened in the instrument panel when the airbag cushion is deployed, and has a frontmost striking part which is closest to an engine room and a rearmost striking part which is closest to the passenger, and
the shortest distance from the second fixed part to the expected strike area is a distance from the second fixed part to the frontmost striking part.

10. The passenger airbag apparatus according to claim 1, wherein the diffuser pocket further comprises:
a connection diffuser unit integrally connecting the cushion-restraining diffuser unit and the holding diffuser unit.

11. The passenger airbag apparatus according to claim 10, wherein the connection diffuser unit comprises:
a connection body part having one end which is connected to the cushion-restraining diffuser unit and the other end which is connected to the holding diffuser unit; and
an inlet hole part formed to pass through the connection body part, formed at a position corresponding to the gas inlet of the housing which is connected to the inflator, and forming a passage through which gas produced in the inflator is introduced between the cushion-restraining diffuser unit and the holding diffuser unit.

12. A method for deploying a passenger airbag apparatus, comprising:
introducing gas produced by an inflator into a diffuser pocket positioned within an airbag cushion stored in a housing, the airbag cushion having a windshield-facing part configured to face a windshield of a vehicle and a passenger-facing part configured to face a passenger when the airbag cushion is deployed; and
restraining a movement of the airbag cushion toward the windshield such that the airbag cushion does not strike the windshield when the airbag cushion is deployed, wherein the diffuser pocket comprises:
a cushion-restraining diffuser unit facing the windshield-facing part of the airbag cushion and having a first end affixed to the housing and a second end configured to deploy out of the housing when the gas is introduced thereto;
a cushion coupling unit connecting the second end of the cushion-restraining diffuser unit and the windshield-facing part of the airbag cushion, and configured to restrain a movement of the windshield-facing part of the airbag cushion toward the windshield; and
a holding diffuser unit shorter than the cushion-restraining diffuser unit, having a first end connected to the housing and a second end connected to the second end of the cushion-restraining diffuser unit, and configured to restrain a movement of the second end of the cushion-restraining diffuser unit toward the windshield.

\* \* \* \* \*